(12) United States Patent
Nakamura et al.

(10) Patent No.: US 11,046,314 B2
(45) Date of Patent: Jun. 29, 2021

(54) CONSTRUCTION MACHINE

(71) Applicant: KCM Corporation, Hyogo (JP)

(72) Inventors: Atsushi Nakamura, Kakogawa (JP); Mototaka Katayama, Akashi (JP); Koji Shimazaki, Kobe (JP)

(73) Assignee: Hitachi Construction Machinery Co., Ltd., Tokyo (JP)

(*) Notice: Subject to any disclaimer, the term of this patent is extended or adjusted under 35 U.S.C. 154(b) by 93 days.

(21) Appl. No.: 15/762,920

(22) PCT Filed: Sep. 23, 2016

(86) PCT No.: PCT/JP2016/004320
§ 371 (c)(1),
(2) Date: Mar. 23, 2018

(87) PCT Pub. No.: WO2017/051540
PCT Pub. Date: Mar. 30, 2017

(65) Prior Publication Data
US 2018/0265086 A1    Sep. 20, 2018

(30) Foreign Application Priority Data
Sep. 25, 2015  (JP) .............................. JP2015-188117

(51) Int. Cl.
*B60W 30/18*    (2012.01)
*F02B 37/24*    (2006.01)
(Continued)

(52) U.S. Cl.
CPC ....... *B60W 30/18009* (2013.01); *B60K 11/06* (2013.01); *B60W 10/02* (2013.01);
(Continued)

(58) Field of Classification Search
CPC ..... B60W 30/18136; B60W 30/18009; B60W 30/1884; B60W 2710/305;
(Continued)

(56) References Cited

U.S. PATENT DOCUMENTS 3,719,888 A * 3/1973 Sampey .................. G01P 1/106
324/161
4,740,898 A * 4/1988 McKee ................ B60K 31/047
180/306
(Continued)

FOREIGN PATENT DOCUMENTS

JP  5-319248 A  12/1993
JP  8-282328 A  10/1996
(Continued)

OTHER PUBLICATIONS

International Search Report (PCT/ISA/210) issued in PCT Application No. PCT/JP2016/004320 dated Dec. 20, 2016 with English translation (five pages).

*Primary Examiner* — Frank B Vanaman
(74) *Attorney, Agent, or Firm* — Crowell & Moring LLP

(57) ABSTRACT

A construction machine includes: an engine driving at least one hydraulic pump configured to supply operating oil to a hydraulic actuator; an exhaust adjustment mechanism adjusting a flow rate of exhaust from the engine; and a control device controlling the exhaust adjustment mechanism. The control device determines whether or not a first downhill traveling condition and/or a second downhill traveling condition are/is satisfied. When at least one of the first downhill traveling condition and the second downhill traveling condition is satisfied, the control device controls the exhaust adjustment mechanism such that the exhaust adjustment mechanism executes exhaust brake.

2 Claims, 3 Drawing Sheets

(51) Int. Cl.

| | |
|---|---|
| *F16H 59/66* | (2006.01) |
| *F02D 9/06* | (2006.01) |
| *F16H 61/14* | (2006.01) |
| *F02D 29/04* | (2006.01) |
| *F02B 37/12* | (2006.01) |
| *F02D 29/00* | (2006.01) |
| *B60W 10/06* | (2006.01) |
| *B60W 10/04* | (2006.01) |
| *B60W 10/02* | (2006.01) |
| *F02D 45/00* | (2006.01) |
| *B60W 30/188* | (2012.01) |
| *B60K 11/06* | (2006.01) |
| *B60W 10/198* | (2012.01) |
| *B60W 10/24* | (2006.01) |
| *B60W 10/30* | (2006.01) |
| *E02F 9/08* | (2006.01) |
| *E02F 9/20* | (2006.01) |
| *E02F 9/22* | (2006.01) |
| *F01P 5/04* | (2006.01) |
| *F16H 61/21* | (2006.01) |
| *E02F 3/28* | (2006.01) |

(52) U.S. Cl.
CPC ........ *B60W 10/023* (2013.01); *B60W 10/026* (2013.01); *B60W 10/04* (2013.01); *B60W 10/06* (2013.01); *B60W 10/198* (2013.01); *B60W 10/24* (2013.01); *B60W 10/30* (2013.01); *B60W 30/1884* (2013.01); *B60W 30/18136* (2013.01); *E02F 9/0883* (2013.01); *E02F 9/2083* (2013.01); *E02F 9/2217* (2013.01); *E02F 9/2253* (2013.01); *F01P 5/04* (2013.01); *F02B 37/12* (2013.01); *F02B 37/24* (2013.01); *F02D 9/06* (2013.01); *F02D 29/00* (2013.01); *F02D 29/04* (2013.01); *F02D 45/00* (2013.01); *F16H 59/66* (2013.01); *F16H 61/14* (2013.01); *F16H 61/21* (2013.01); *B60W 2300/17* (2013.01); *B60W 2510/0638* (2013.01); *B60W 2510/104* (2013.01); *B60W 2520/10* (2013.01); *B60W 2710/024* (2013.01); *B60W 2710/0638* (2013.01); *B60W 2710/18* (2013.01); *B60W 2710/30* (2013.01); *B60W 2710/305* (2013.01); *B60Y 2200/415* (2013.01); *B60Y 2300/181* (2013.01); *E02F 3/283* (2013.01); *F02D 2200/501* (2013.01); *F02D 2200/602* (2013.01); *F02D 2200/702* (2013.01); *F16H 2061/216* (2013.01); *Y02T 10/12* (2013.01)

(58) Field of Classification Search
CPC .......... B60W 2710/024; B60W 10/023; F02D 29/02; F02D 29/04
See application file for complete search history.

(56) References Cited

U.S. PATENT DOCUMENTS

| | | | | |
|---|---|---|---|---|
| 5,410,477 | A * | 4/1995 | Ishii | ........................ B60T 8/174 701/102 |
| 5,487,005 | A * | 1/1996 | Genise | .................... F16H 59/52 477/120 |
| 5,683,329 | A * | 11/1997 | Kono | .................... F16H 61/143 477/176 |
| 5,695,427 | A * | 12/1997 | Sato | .................. F16H 61/66259 477/43 |
| 6,314,729 | B1* | 11/2001 | Crull | ...................... F01P 7/044 60/452 |
| 6,652,414 | B1 | 11/2003 | Banks, III | |
| 7,849,688 | B2 | 12/2010 | Dvorak et al. | |
| 2001/0005806 | A1 | 6/2001 | Kim | |
| 2010/0168976 | A1 | 7/2010 | Andrasko et al. | |
| 2010/0307465 | A1* | 12/2010 | Haldeman | ............... F02B 39/10 123/565 |
| 2014/0209061 | A1* | 7/2014 | Neto | ...................... F02D 13/04 123/320 |

FOREIGN PATENT DOCUMENTS

| | | |
|---|---|---|
| JP | 10-18866 A | 1/1998 |
| JP | 11-118030 A | 4/1999 |
| JP | 2001-200740 A | 7/2001 |
| WO | WO 2014/178785 A1 | 11/2014 |

* cited by examiner

CONSTRUCTION MACHINE

TECHNICAL FIELD

The present invention relates to a construction machine including an engine driving at least one hydraulic pump.

BACKGROUND ART

In a construction machine including a hydraulic actuator, a hydraulic pump configured to supply operating oil to the hydraulic actuator is driven by an engine (see PTL 1, for example). According to such construction machine, if an engine revolution speed becomes too high, devices such as the hydraulic pump may be damaged.

CITATION LIST

Patent Literature

PTL 1: U.S. Pat. No. 7,849,688, Specification

SUMMARY OF INVENTION

Technical Problem

For example, to prevent the engine revolution speed from becoming too high, there is a method of, when the engine revolution speed becomes a threshold or more, reducing a flow rate of exhaust from the engine to increase a load of the engine (i.e., so-called exhaust brake).

When the exhaust brake is automatically executed by comparing the engine revolution speed with the threshold, on and off of the exhaust brake are switched frequently. Such frequent switching of the on and off of the exhaust brake is not preferable from the viewpoint of durability of engine parts (such as a turbocharger).

An object of the present invention is to provide a construction machine capable of preventing an engine revolution speed from becoming too high by utilizing exhaust brake without frequently switching on and off of the exhaust brake.

Solution to Problem

To solve the above problems, the inventors of the present invention have diligently studied, and as a result, have focused on the fact that: during downhill traveling, a high revolution speed (high vehicle speed) is maintained, and a state where an engine does not use energy for traveling continues. Based on this, the inventors of the present invention have thought of an idea of automatically executing exhaust brake during the downhill traveling. With this, the inventors of the present invention have thought that frequent switching of the on and off of the exhaust brake can be prevented. The present invention was made from such viewpoint.

To be specific, the present invention provides a construction machine including: an engine driving at least one hydraulic pump configured to supply operating oil to a hydraulic actuator; an exhaust adjustment mechanism adjusting a flow rate of exhaust from the engine; and a control device controlling the exhaust adjustment mechanism, wherein: the control device determines whether or not a first downhill traveling condition and/or a second downhill traveling condition are/is satisfied, the first downhill traveling condition being a condition in which an actual revolution speed of engine is a set revolution speed or more and a load factor of the engine is a set rate or less, the second downhill traveling condition being a condition in which when the engine is coupled to a wheel through a transmission, an actual vehicle speed is not less than an allowable vehicle speed of a vehicle speed mode selected by an operator; and the control device controls the exhaust adjustment mechanism such that the exhaust adjustment mechanism executes exhaust brake when at least one of the first downhill traveling condition and the second downhill traveling condition is satisfied.

According to the above configuration, since the exhaust brake is automatically executed during downhill traveling, the engine revolution speed can be prevented from becoming too high by utilizing the exhaust brake without frequently switching on and off of the exhaust brake. In addition, since braking force other than braking force of a foot brake acts during the downhill traveling, the frequency of use of the foot brake can be reduced.

For example, the vehicle speed may be a revolution speed of an output shaft of the transmission.

The control device may control the exhaust adjustment mechanism such that the exhaust adjustment mechanism cancels the exhaust brake when the actual revolution speed of the engine is less than a secondary set revolution speed that is not more than the set revolution speed, and the actual vehicle speed is less than a set vehicle speed that is not more than the allowable vehicle speed, or when an accelerator pedal is stepped on. According to this configuration, the exhaust brake can be canceled at an appropriate timing.

The construction machine may be configured such that: the at least one hydraulic pump includes a fan pump; the construction machine further includes a fan motor supplied with the operating oil from the fan pump and configured to cool the engine and a fan circuit configured to set a revolution speed of the fan motor; and when at least one of the first downhill traveling condition and the second downhill traveling condition is satisfied, the control device controls the fan circuit such that the revolution speed of the fan motor becomes a predetermined value or more. According to this configuration, even when only the exhaust brake does not suffice, such as when acceleration during the downhill traveling is large, the engine revolution speed can be prevented from becoming too high.

The construction machine may be configured such that: the at least one hydraulic pump includes a main pump; the construction machine further includes a circulation line extending from the main pump through a cargo circuit to a tank, a release line branching from the circulation line at a position upstream of the cargo circuit, the release line extending to the tank, a relief valve being provided on the release line, and an on-off valve provided on the circulation line at a position downstream of a branch point of the release line; and the control device controls the on-off valve such that the on-off valve closes the circulation line when at least one of the first downhill traveling condition and the second downhill traveling condition is satisfied. According to this configuration, even when only the exhaust brake does not suffice, such as when acceleration during the downhill traveling is large, the engine revolution speed can be prevented from becoming too high.

The construction machine may further include: a wheel coupled to the engine through the transmission and a torque converter that is a fluid coupling; and a lock-up device configured to switch fixing and unfixing between an output shaft of the torque converter and an input shaft of the torque converter, wherein the control device may control the lock-up device such that the lock-up device fixes the output shaft of the torque converter to the input shaft of the torque converter when at least one of the first downhill traveling condition and the second downhill traveling condition is satisfied. According to this configuration, even when only the exhaust brake does not suffice, such as when acceleration during the downhill traveling is large, the engine revolution speed can be prevented from becoming too high.

For example, the above construction machine may further include a turbocharger including a compressor and a turbine, the compressor and the turbine being connected to the engine, wherein: the turbine may be a variable nozzle turbine; and the exhaust adjustment mechanism may change an opening degree of a nozzle of the turbine to adjust a flow rate of exhaust from the engine.

Advantageous Effects of Invention

According to the present invention, the engine revolution speed can be prevented from becoming too high by utilizing the exhaust brake without frequently switching the on and off of the exhaust brake.

DESCRIPTION OF EMBODIMENTS

Figure 1:
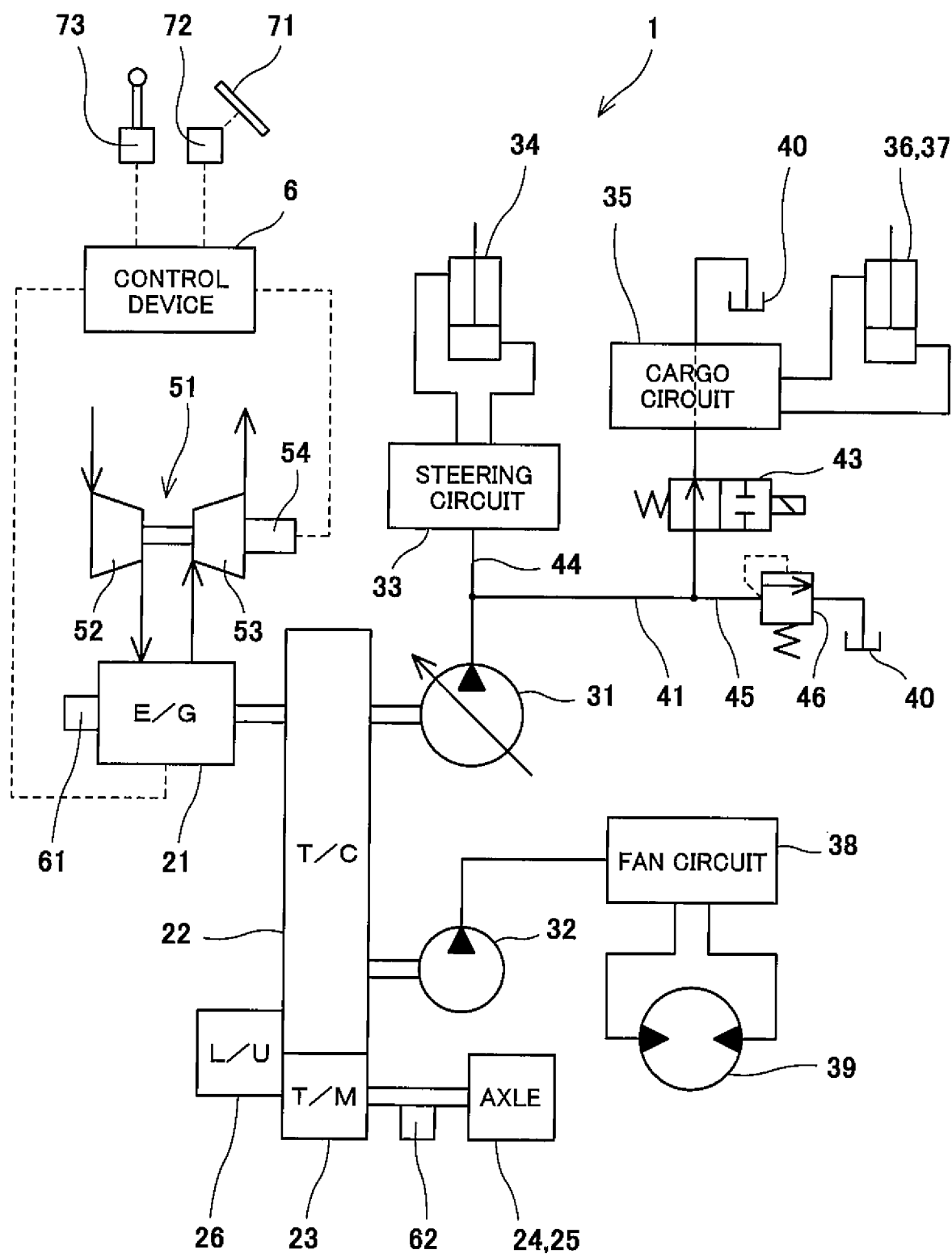
FIG. 1 is a diagram schematically showing a schematic configuration of a construction machine according to one embodiment of the present invention.
Figure 2:
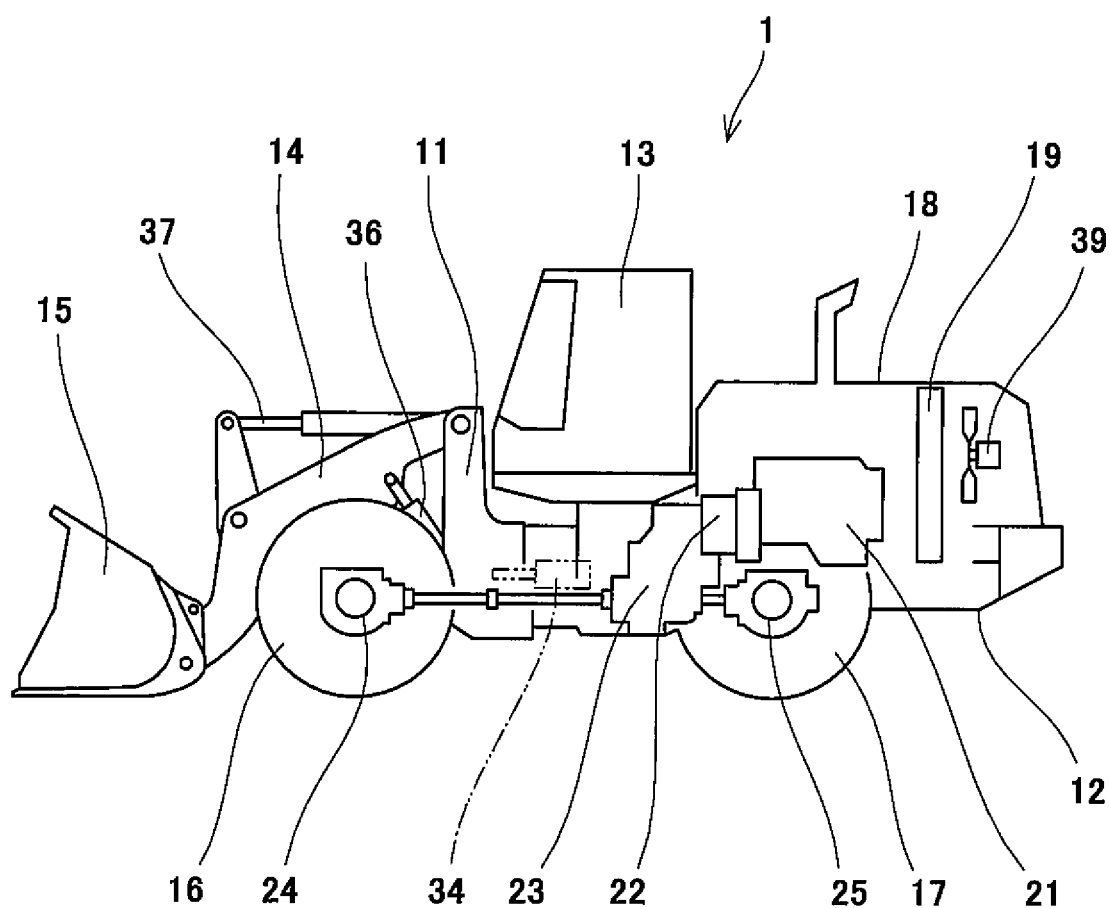
FIG. 2 is a side view of the construction machine shown in FIG. 1.

FIG. 2 shows a construction machine 1 according to one embodiment of the present invention. FIG. 1 schematically shows a schematic configuration of the construction machine 1. The construction machine 1 shown in FIG. 2 is a wheel loader that is one of wheel traveling type industrial vehicles. It should be noted that the present invention is also applicable to other industrial vehicles such as shovel loaders, forklifts, and truck cranes.

As shown in FIG. 2, the construction machine 1 includes a front vehicle body 11 and a rear vehicle body 12 which are coupled to each other so as to be swingable in a horizontal direction. A front wheel 16 is attached to the front vehicle body 11, and a rear wheel 17 is attached to the rear vehicle body 12. A pair of left and right steering cylinders (hydraulic actuators) 34 for changing a traveling direction is provided between the front vehicle body 11 and the rear vehicle body 12.

The rear vehicle body 12 is provided with a driver's cab 13 and an engine room 18. An engine 21, a radiator 19, and a fan motor (hydraulic actuator) 39 are arranged in the engine room 18, and the radiator 19 and the fan motor 39 cool the engine 21. A boom 14 is coupled to the front vehicle body 11 so as to be swingable in a vertical direction, and a bucket 15 is coupled to a tip end of the boom 14 so as to be swingable in the vertical direction. The front vehicle body 11 is provided with a pair of left and right boom cylinders (hydraulic actuators) 36 configured to actuate the boom 14 and a bucket cylinder (hydraulic actuator) 37 configured to actuate the bucket 15.

As shown in FIGS. 1 and 2, the engine 21 is coupled to the wheels 16 and 17 through a torque converter 22, a transmission 23, and axles 24 and 25. It should be noted that the transmission 23 can change a speed ratio between input and output shafts thereof and can switch a rotational direction of the output shaft between the same direction as the input shaft and an opposite direction to the input shaft for switching between forward traveling and backward traveling of the vehicle.

The torque converter 22 is a fluid coupling. In the present embodiment, there is provided a lock-up device 26 configured to switch fixing and unfixing between an output shaft of the torque converter 22 and an input shaft of the torque converter 22.

A main pump 31 and a fan pump 32 are hydraulic pumps and coupled to the torque converter 22. To be specific, the main pump 31 and the fan pump 32 are driven by the engine 21. The fan pump 32 may be directly coupled to the engine 21.

The main pump 31 supplies operating oil through a cargo circuit 35 to the boom cylinders 36 and the bucket cylinder 37 and also supplies the operating oil through a steering circuit 33 to the steering cylinders 34. To simplify FIG. 1, the pair of boom cylinders 36 and the bucket cylinder 37 are shown by one cylinder sign, and the pair of steering cylinders 34 are also shown by one cylinder sign.

A circulation line 41 extends from the main pump 31 through the cargo circuit 35 to a tank 40. To be specific, the circulation line 41 constitutes a center bypass line of the cargo circuit 35. A branch line 44 branches from the circulation line 41 at a position upstream of the cargo circuit 35. The branch line 44 is connected to the steering circuit 33.

The cargo circuit 35 includes: a boom control valve (not shown) configured to control supplying and discharging the operating oil to and from the boom cylinders 36; and a bucket control valve (not shown) configured to control supplying and discharging the operating oil to and from the bucket cylinder 37. For example, an operating valve including an operating lever outputs pilot pressure to each of the control valves. The steering circuit 33 includes a steering valve (not shown) configured to control supplying and discharging the operating oil to and from the steering cylinders 34. For example, a steerage signal output device such as an ORBIT ROLL (registered trademark in Japan) outputs a steerage signal (pilot stream) to the steering valve.

Further, a release line 45 branches from the circulation line 41 at a position upstream of the cargo circuit 35. The release line 45 extends to the tank 40. A relief valve 46 is provided on the release line 45.

An on-off valve 43 is provided on the circulation line 41 at a position downstream of a branch point of the release line 45. The on-off valve 43 switches to open or close the circulation line 41. In the present embodiment, the on-off valve 43 is arranged upstream of the cargo circuit 35. However, the on-off valve 43 may be arranged downstream of the cargo circuit 35.

The fan pump 32 supplies the operating oil through a fan circuit 38 to the fan motor 39. The fan circuit 38 sets a revolution speed of the fan motor 39 and, for example, includes: a pressure reducing valve introducing arbitrary pressure to a flow-out line of the fan motor 39; and an electromagnetic proportional valve outputting pilot pressure to the pressure reducing valve.

The engine 21 is connected to a compressor 52 and turbine 53 of a turbocharger 51. In the present embodiment, the turbine 53 is a variable nozzle turbine, and an opening degree of a nozzle of the turbine 53 is changed by an exhaust adjustment mechanism 54. To be specific, the exhaust adjustment mechanism 54 adjusts a flow rate of exhaust from the engine 21.

The exhaust adjustment mechanism 54 is controlled by a control device 6. The control device 6 is connected to: a revolution speed meter 61 configured to detect an actual revolution speed N of the engine 21; a vehicle speed meter 62 configured to detect an actual vehicle speed S of the construction machine 1; a pedal sensor 72 configured to detect a step-on amount of an accelerator pedal 71; and a vehicle speed mode selector 73. In the present embodiment, the vehicle speed meter 62 is a revolution speed meter configured to detect a revolution speed of the output shaft of the transmission 23 as the vehicle speed.

The vehicle speed mode selector 73 is arranged in the driver's cab 13 and accepts a selection made from a plurality of vehicle speed modes by an operator. In the present embodiment, the vehicle speed modes indicate the speed ratios of the transmission 23 by a plurality of stages (such as first to fifth stages). However, the vehicle speed modes do not necessarily have to indicate the speed ratios of the transmission 23 by the plurality of stages. For example, the vehicle speed modes may include a manual mode of manually switching the speed ratios of the transmission 23 and an automatic mode of automatically switching the speed ratios of the transmission 23 or may be a plurality of driving modes in which respective different upper limits of the engine revolution speed are determined.

The control device 6 may be constituted by an engine control device controlling engine related devices and a vehicle body controller controlling hydraulic devices or may be constituted by one unit collectively controlling all the devices.

Figure 3:
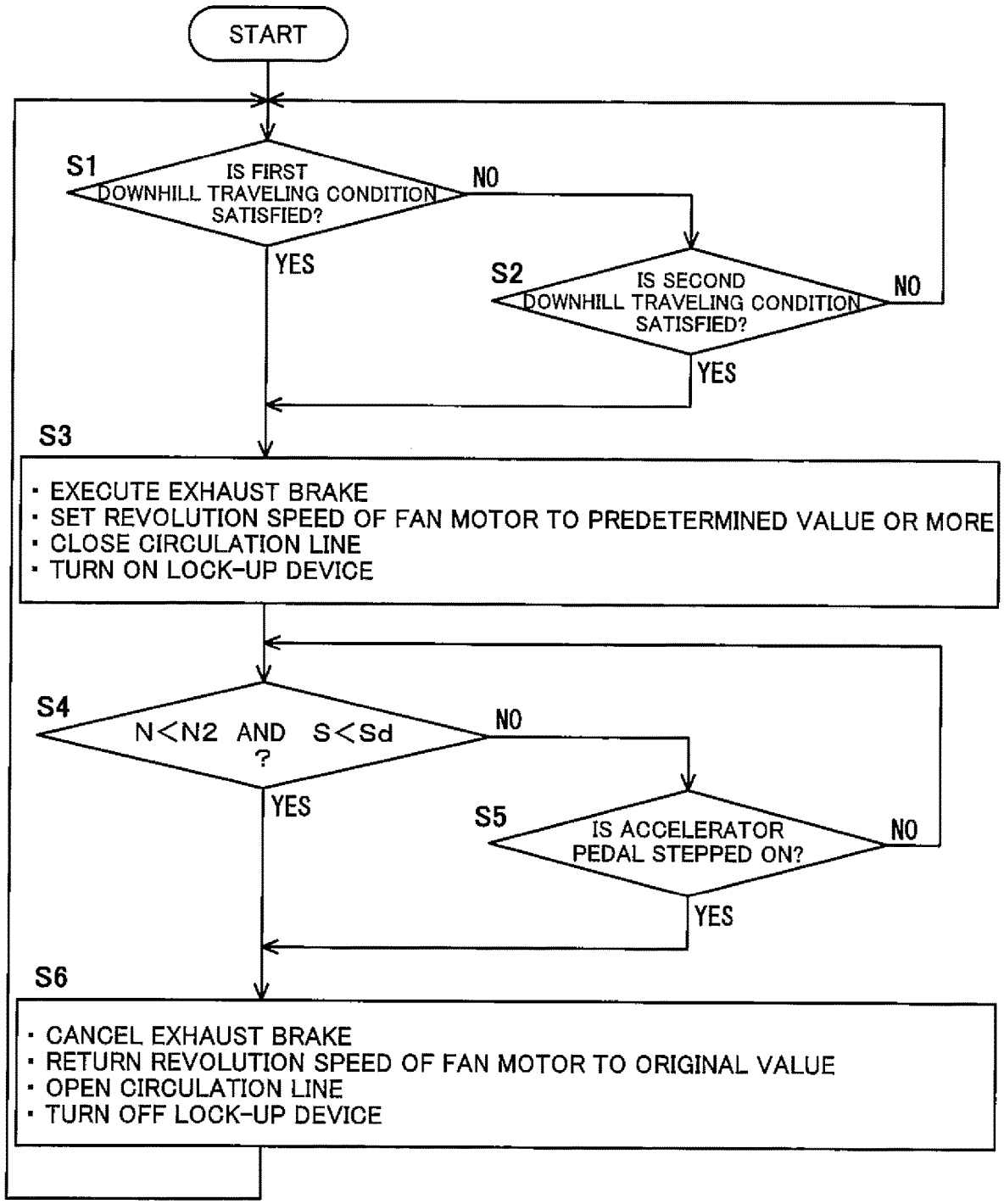
FIG. 3 is a flow chart of control operations performed by a control device.

Hereinafter, control operations performed by the control device 6 will be explained in reference to a flow chart shown in FIG. 3.

First, the control device 6 determines whether or not a first downhill traveling condition is satisfied (Step Si). The first downhill traveling condition is a condition in which: the actual revolution speed N of the engine 21 detected by the revolution speed meter 61 is a first set revolution speed N1 (for example, 2,000 to 2,400 rpm) or more; and a load factor of the engine 21 is a predetermined rate R (for example, 5 to 20%) or less. The load factor of the engine 21 can be calculated from, for example, the amount of fuel injected to the engine 21.

When the first downhill traveling condition is satisfied (YES in Step S1), the process proceeds to Step S3. When the first downhill traveling condition is not satisfied (NO in Step S1), the process proceeds to Step S2.

In Step S2, the control device 6 determines whether or not a second downhill traveling condition is satisfied. The second downhill traveling condition is a condition in which the actual vehicle speed S detected by the vehicle speed meter 62 is not less than an allowable vehicle speed SL of the vehicle speed mode selected with the vehicle speed mode selector 73. For example, the allowable vehicle speed SL can be calculated from the speed ratio of the transmission 23, which ratio is determined for each vehicle speed mode, and the first set revolution speed.

When the second downhill traveling condition is satisfied (YES in Step S2), the process proceeds to Step S3. When the second downhill traveling condition is not satisfied (NO in Step S2), the process returns to Step Si. In the present embodiment, whether or not the first downhill traveling condition is satisfied is first determined, and whether or not the second downhill traveling condition is satisfied is then determined. However, whether or not the second downhill traveling condition is satisfied may be first determined, and whether or not the first downhill traveling condition is satisfied may be then determined. To be specific, the process is only required to be set to proceed to Step 3 when any one of the first downhill traveling condition and the second downhill traveling condition is satisfied. Or, the process may adopt only one of Steps S1 and S2. When only the first downhill traveling condition is adopted, the vehicle speed mode selector 73 may not be provided, and the speed ratios of the transmission 23 may be automatically switched.

In Step S3, the control device 6 performs an operation of increasing the load of the engine 21, in other words, an operation of causing braking force to act on the engine 21. In the present embodiment, the control device 6 performs four operations 1 to 4 below.

Operation 1: Control the exhaust adjustment mechanism 54 such that the exhaust adjustment mechanism 54 executes exhaust brake (i.e., reduces the flow rate of the exhaust from the engine 21 to increase the load of the engine 21)

Operation 2: Control the fan circuit 38 such that the revolution speed of the fan motor 39 becomes a predetermined value (for example, twice a normal revolution speed) or more.

Operation 3: Control the on-off valve 43 such that the on-off valve 43 closes the circulation line 41.

Operation 4: Control the lock-up device 26 such that the lock-up device 26 fixes the output shaft of the torque converter 22 to the input shaft of the torque converter 22.

It should be noted that the control device 6 is only required to perform at least Operation 1. In addition to Operation 1, the control device 6 may perform one or two out of Operations 2 to 4 or may perform none of Operations 2 to 4.

After that, until a condition for canceling the operation of increasing the load is satisfied, the control device 6 keeps on performing Operations 1 to 4. In the present embodiment, first, the control device 6 determines whether or not the actual revolution speed N of the engine 21 is less than a second set revolution speed N2, and the actual vehicle speed S is less than a set vehicle speed Sd (Step S4). The second set revolution speed N2 may be equal to the first set revolution speed N1 or may be less than the first set revolution speed N1. The set vehicle speed Sd may be equal to the allowable vehicle speed SL or may be less than the allowable vehicle speed SL. If YES in Step S4, the process proceeds to Step S6. If NO in Step S4, the process proceeds to Step S5.

In Step S5, the control device 6 determines whether or not the accelerator pedal 71 is stepped on. If YES in Step S5, the process proceeds to Step S6. If NO in Step S5, the process returns to Step S4. In the present embodiment, Step S5 is performed after Step S4. However, Step S4 may be performed after Step S5. Or, the process may adopt only one of Steps S4 and S5.

In Step S6, the control device 6 stops performing all Operations 1 to 4. Specifically, the control device 6 (1) controls the exhaust adjustment mechanism 54 such that the exhaust adjustment mechanism 54 cancels the exhaust brake, (2) controls the fan circuit 38 such that the revolution speed of the fan motor 39 returns to an original speed, (3) controls the on-off valve 43 such that the on-off valve 43 opens the circulation line 41, and (4) controls the lock-up device 26 such that the lock-up device 26 unfixes the output shaft of the transmission 23 from the input shaft of the transmission 23. Then, the process returns to Step S1.

As explained above, according to the construction machine 1 of the present embodiment, the exhaust brake is automatically executed during the downhill traveling based on the determinations in Steps S1 and S2. Therefore, the engine revolution speed can be prevented from becoming too high by utilizing the exhaust brake without frequently switching the on and off of the exhaust brake. In addition, since braking force other than braking force of a foot brake acts during the downhill traveling, the frequency of use of the foot brake can be reduced.

Further, in the present embodiment, the exhaust brake can be canceled at an appropriate timing based on the determinations in Steps S4 and S5.

Furthermore, in the present embodiment, during the downhill traveling, in addition to the execution of the exhaust brake, the revolution speed of the fan motor 39 is set to the predetermined value or more, the operating oil flows through the relief valve 46 by closing the circulation line 41, and engine brake acts by turning on the lock-up device 26. With this, even when only the exhaust brake does not suffice, such as when acceleration during the downhill traveling is large (for example, when the angle of a slope is large or when the downhill traveling is performed while holding a burden by the bucket 15), the engine revolution speed can be prevented from becoming too high. For example, when the revolution speed of the fan motor 39 is 500 rpm during a normal time in which the temperatures of the operating oil and the cooling water are low, the revolution speed of the fan motor 39 during the downhill traveling is set to about 1,500 rpm. With this, the revolution speed of the engine 21 can be reduced by about 300 rpm. It should be noted that only one or two out of Operations 2 to 4 may be performed in accordance with a situation.

MODIFIED EXAMPLE

The present invention is not limited to the above embodiment, and various modifications may be made within the scope of the present invention.

For example, the present invention is applicable to construction machines, such as hydraulic excavators (including crawlers), which are not wheel traveling type vehicles. To be specific, traveling of the construction machine may be performed by hydraulic motors to which the operating oil is supplied from the main pump 31.

The exhaust adjustment mechanism 54 may be any mechanism as long as it can adjust the flow rate of the exhaust from the engine 21. For example, when the turbine 53 of the turbocharger 51 is not the variable nozzle turbine or when the turbocharger 51 is not provided, the exhaust adjustment mechanism 54 may be a butterfly valve provided on an exhaust passage extending from the engine 21.

REFERENCE SIGNS LIST 1 construction machine
16, 17 wheel
21 engine
22 torque converter
23 transmission
26 lock-up device
31 main pump (hydraulic pump)
32 fan pump (hydraulic pump)
34 steering cylinder (hydraulic actuator)
35 cargo circuit
36 boom cylinder (hydraulic actuator)
37 bucket cylinder (hydraulic actuator)
38 fan circuit
39 fan motor (hydraulic actuator)
40 tank
41 circulation line
43 on-off valve
45 release line
46 relief valve
51 turbocharger
52 compressor
53 turbine
54 exhaust adjustment mechanism
6 control device

The invention claimed is:

1. A construction machine comprising:
an engine driving a plurality of hydraulic pumps configured to supply operating oil to a hydraulic actuator;
a wheel coupled to the engine through a transmission;
a torque converter that is a fluid coupling and interposed between the engine and the transmission;
a lock-up device configured to switch fixing and unfixing between an output shaft of the torque converter and an input shaft of the torque converter;
a main pump serving as one of the hydraulic pumps and coupled to and driven by the torque converter, the main pump being configured to supply the operating oil to a boom cylinder configured to actuate a boom, a bucket cylinder configured to actuate a bucket, and a steering cylinder;
a fan pump serving as one of the hydraulic pumps and coupled to and driven by the torque converter;
a fan motor supplied with the operating oil from the fan pump through a fan circuit and configured to cool the engine;
an exhaust adjustment mechanism adjusting a flow rate of exhaust from the engine;
a control device controlling the exhaust adjustment mechanism;
a circulation line extending from the main pump through a cargo circuit to a tank;
a release line branching from the circulation line at a position upstream of the cargo circuit, the release line extending to the tank, a relief valve being provided on the release line;
an on-off valve provided on the circulation line at a position upstream of the cargo circuit and downstream of a branch point of the release line; and
a steering circuit branching from the circulation line at a position upstream of the on-off valve and connected to the steering cylinder, wherein:
the control device determines whether or not a condition in which an actual revolution speed of the engine is a set revolution speed or more and a load factor of the engine calculated from an amount of fuel injected to the engine is a set rate or less is satisfied;
when the condition is satisfied, and therefore, the control device determines that the construction machine is traveling downhill, the control device i) controls the exhaust adjustment mechanism such that the exhaust adjustment mechanism executes exhaust braking, ii) controls the fan circuit such that a revolution speed of the fan motor becomes a predetermined value or more, iii) controls the on-off valve such that the on-off valve closes the circulation line, and iv) controls the lock-up device such that the lock-up device fixes the output shaft of the torque converter to the input shaft of the torque converter;
when the actual revolution speed of the engine is less than a second set revolution speed that is the set revolution speed or less, and an actual vehicle speed is less than a set vehicle speed that is the allowable vehicle speed or less, or when an accelerator pedal is stepped on, the control device i) controls the exhaust adjustment mechanism such that the exhaust adjustment mechanism cancels the exhaust brake, ii) controls the fan circuit such that the revolution speed of the fan motor becomes a revolution speed having a value before the revolution speed of the fan motor becomes the predetermined value or more, iii) controls the on-off valve such that the on-off valve opens the circulation line, and iv) controls the lock-up device such that the lock-up device unfixes the output shaft of the torque converter from the input shaft of the torque converter.

2. The construction machine according to claim 1, further comprising a turbocharger including a compressor and a turbine, the compressor and the turbine being connected to the engine, wherein:

the turbine is a variable nozzle turbine; and the exhaust adjustment mechanism changes an opening degree of a nozzle of the turbine to adjust a flow rate of exhaust from the engine.

\* \* \* \* \*